United States Patent
Brophy et al.

(10) Patent No.: US 6,934,310 B2
(45) Date of Patent: Aug. 23, 2005

(54) RETURN PATH TRANSMITTER HAVING A CLOSED LASER CONTROL LOOP THAT IS EMPLOYED IN A HYBRID FIBER / COAX TRANSMISSION

(75) Inventors: Timothy J. Brophy, Holland, PA (US); Brian T. Harte, Trooper, PA (US); Daniel Charles Fiorella, III, Blue Bell, PA (US)

(73) Assignee: General Instrument Corporation, Horsham, PA (US)

( * ) Notice: Subject to any disclaimer, the term of this patent is extended or adjusted under 35 U.S.C. 154(b) by 215 days.

(21) Appl. No.: 10/317,029

(22) Filed: Dec. 11, 2002

(65) Prior Publication Data

US 2004/0001520 A1 Jan. 1, 2004

Related U.S. Application Data

(60) Provisional application No. 60/340,796, filed on Dec. 12, 2001.

(51) Int. Cl.[7] .............................. H01S 3/00; H04B 10/00
(52) U.S. Cl. .................................. 372/38.02; 372/38.07
(58) Field of Search ........................... 372/38.02, 38.07, 372/38

(56) References Cited

U.S. PATENT DOCUMENTS

| | | | |
|---|---|---|---|
| 5,604,757 A | * | 2/1997 | Liang et al. .............. 372/38.04 |
| 5,737,109 A | | 4/1998 | Goodwin ..................... 359/161 |
| 5,847,751 A | | 12/1998 | Safadi ............................ 348/7 |
| 5,878,325 A | | 3/1999 | Dail ............................ 455/5.1 |
| 5,881,362 A | | 3/1999 | Eldering et al. ............. 455/4.2 |
| 5,909,154 A | | 6/1999 | Brown et al. ................ 333/100 |
| 6,064,681 A | | 5/2000 | Ackerman .................... 372/32 |
| 6,122,302 A | * | 9/2000 | Dean ...................... 372/29.021 |
| 6,233,262 B1 | * | 5/2001 | Mesh et al. .................... 372/32 |
| 6,252,692 B1 | * | 6/2001 | Roberts ....................... 398/147 |
| 6,519,067 B2 | * | 2/2003 | Farhan et al. ................. 398/98 |

* cited by examiner

Primary Examiner—James Vannucci
(74) Attorney, Agent, or Firm—Lawrence T. Cullen

(57) ABSTRACT

An optical transmitter is provided that includes a laser subassembly generating an optical signal having a plurality of operating characteristics. A controller, which drives the laser subassembly by applying at least one control parameter thereto, includes a predetermined, empirically derived database relating the plurality of operating characteristics of the laser subassembly to the control parameters. The controller adjusts at least one control parameter based at least in part on data extracted from the database so that the operating characteristic is substantially optimized.

29 Claims, 3 Drawing Sheets

-PRIOR ART-

-PRIOR ART-

RETURN PATH TRANSMITTER HAVING A CLOSED LASER CONTROL LOOP THAT IS EMPLOYED IN A HYBRID FIBER / COAX TRANSMISSION

STATEMENT OF RELATED APPLICATION

This application claims the benefit of priority to U.S. Provisional Patent Application No. 60/340,796, filed Dec. 12, 2001 and entitled "Return Path Transmitter Having A Closed Laser Control Loop That Is Employed In A Hybrid Fiber/Coax Transmission system.

FIELD OF THE INVENTION

The present invention relates generally to hybrid fiber/coax transmission systems, and more particularly to a transmitter in an optical node of the transmission system for transmitting upstream information from a subscriber to a headend.

BACKGROUND OF THE INVENTION

Currently, transmission systems employed in the cable television industry provide two-way transmission of information ( e.g., video, multimedia and/or data) between the headend and a plurality of subscribers. Typically, the headend transmits the information destined for individual subscribers ("downstream information") in an optical format, via one or more fiber optic links to one or more optical nodes. Each node converts the optically formatted downstream information into electrical signals for distribution, typically via a cable plant having a hybrid fiber/coax (HFC) architecture, to individual subscribers.

In addition to receiving the downstream information, each individual subscriber may generate information in the form of voice, data, or a combination thereof, destined for the headend. En route to other subscribers or service providers, the subscriber-generated information ("upstream information") is segmented by the coaxial cable plant and passes it to the node for conversion into an optical format for transmission to the headend. The return path frequency band (e.g., 5–40 MHz) associated with the upstream information is often shared by all subscribers served by the same optical node.

Cable service providers are accustomed to low cost hardware and software components. This has typically constrained the technical capability of the equipment employed in the upstream or return path. Traditionally, this has caused the return path to play a limited role in furnishing, for example, such services as pay-per-view (PPV) or video-on-demand (VOD). In particular, the laser transmitters employed in the optical nodes that transmit information to the headend have been relatively simple, low cost designs. For example, it is well known that the gain of a return laser transmitter fluctuates as a result of environmental changes such as temperature changes and may exhibit a loss of performance due to aging. In conventional systems, the gain or optical power of the return path laser was only stabilized from typical changes arising from temperature fluctuations. Even in this case, the stabilization techniques that were employed were limited to techniques that did not take into account the particular characteristics of the individual laser. They also did not monitor the actual signal drive levels and laser output power to make real-time adjustments for other environmental changes. These laser stabilization circuits were often based on the typical performance of a large population of measured lasers.

The demand from consumers to support interactive applications through cable television services has greatly increased in recent years and this increase is expected to continue. This increased level of services demands a commensurate increase in cable television network speed and performance along the return path, which places more stringent requirements on the return path laser transmitter in an HFC transmission system such that they have a better parametric stability with respect to environmental changes.

SUMMARY OF THE INVENTION

In accordance with the present invention, an optical transmitter is provided that includes a laser subassembly generating an optical signal having a plurality of operating characteristics. A controller, which drives the laser subassembly by applying at least one control parameter thereto, includes a predetermined, empirically derived database relating the plurality of operating characteristics of the laser subassembly to the control parameters. The controller adjusts at least one control parameter based at least in part on data extracted from the database so that the operating characteristic is substantially optimized.

In accordance with one aspect of the invention, the database is included in a closed-loop control circuit. Alternatively, the controller may include a look-up table in which the database is located.

In accordance with another aspect of the invention, the plurality of operating characteristics of the laser subassembly includes the optical output power. The operating characteristics may also include the BER, NPR and distortion.

In accordance with yet another aspect of the invention, the control parameter includes a bias level, temperature, RF drive level, slope efficiency, tracking error control and threshold voltage.

In accordance with another aspect of the invention, a method is provided to account for performance variations in individual laser subassemblies that are to be employed in optical transmitters generating an optical signal having a plurality of operating characteristics. The method begins by generating, for each individual laser subassembly while in an operational state, a correction curve relating the plurality of operating characteristics of the laser subassembly to a plurality of control parameters applied thereto. For each individual laser subassembly, a controller is provided for driving the laser subassembly by applying at least one of the control parameters thereto. For each individual laser subassembly, communication is established between the controller and the correction curve associated with a given laser assembly so that the control parameters are adjustable based on the correction curve to substantially optimize at least one of the operating characteristics of the given laser subassembly.

DETAILED DESCRIPTION

Figure 1:
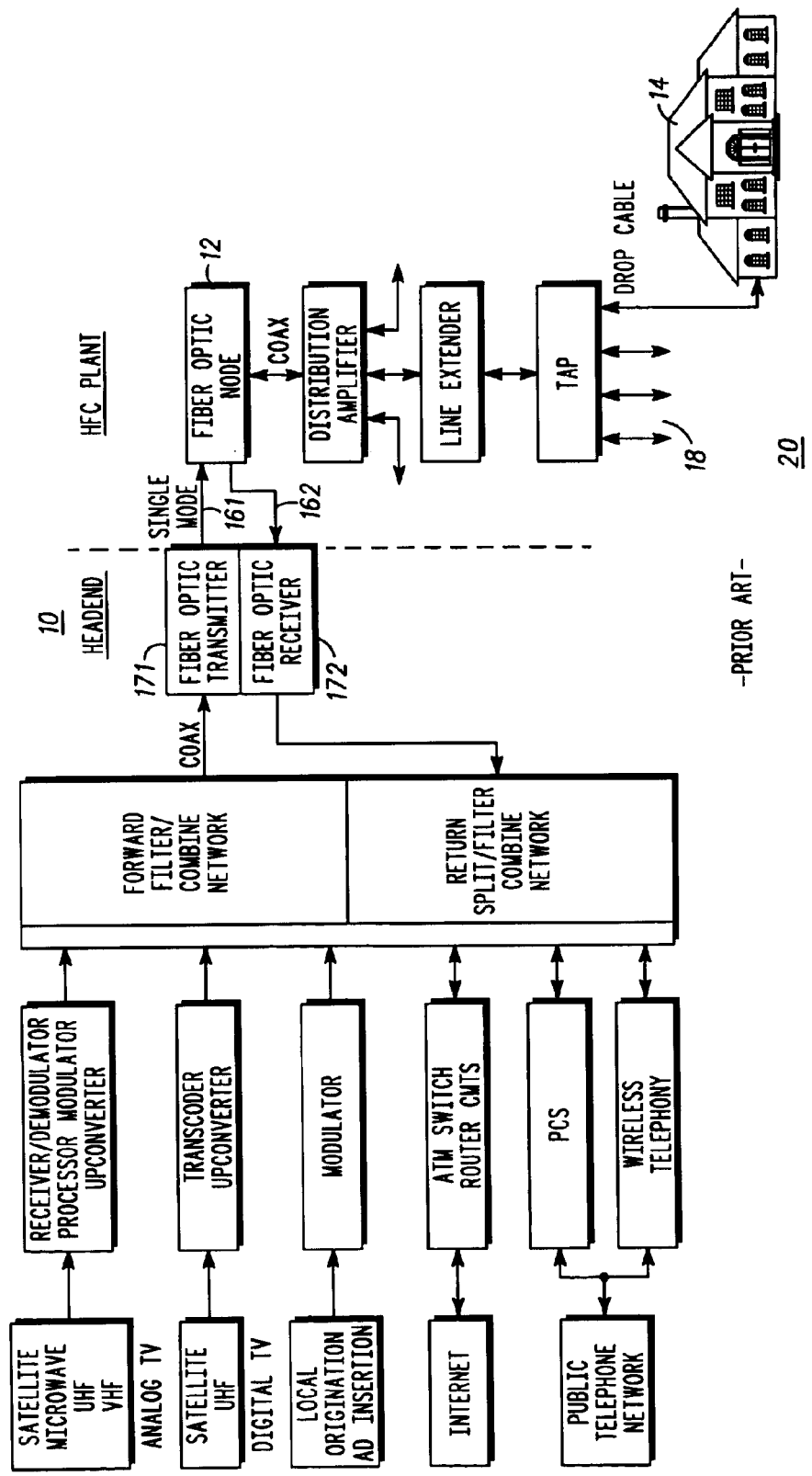
FIG. 1 shows a conventional hybrid fiber/coax transmission system.

FIG. 1 depicts a conventional hybrid fiber/coax transmission system 20. The system 20 includes a headend 10 for forwarding information; e.g., video, audio, multimedia, and/or data ("downstream information") for transmission to individual subscribers 14. The headend also receives information ("upstream information"), e.g., video, audio, multimedia, and/or data generated by one or more of the subscribers 14 via a set top box or cable modem.

In practice, a combination of optical fibers and coaxial cables carry the downstream information from the headend 10 to the subscribers 14 and carry the upstream information from the subscriber's terminal 14 to the headend 10. As seen in FIG. 1, an optical upstream fiber 162 carries upstream information in optical format between the headend 10 and an optical node 12. Similarly, an optical downstream fiber 161 carries downstream information in an optical format between the headend 10 and optical node 12. A single coaxial cable 18 carries upstream information in electrical format between a group of subscribers 14 and the optical node 12 as well as carrying downstream information between the optical node 12 and subscribers 14. This upstream and downstream information is placed on different frequency bands and is therefore controlled by a filter, which is internal to the node 12. At the headend, an optical to electrical (O/E) receiver 172 converts (demodulates) the optically formatted upstream information into electrical signals for subsequent processing. An electrical to optical(E/O) laser transmitter 171 within the headend 10 optically formats downstream information for transmission via downstream fiber 161 to the optical node 12.

Figure 2:
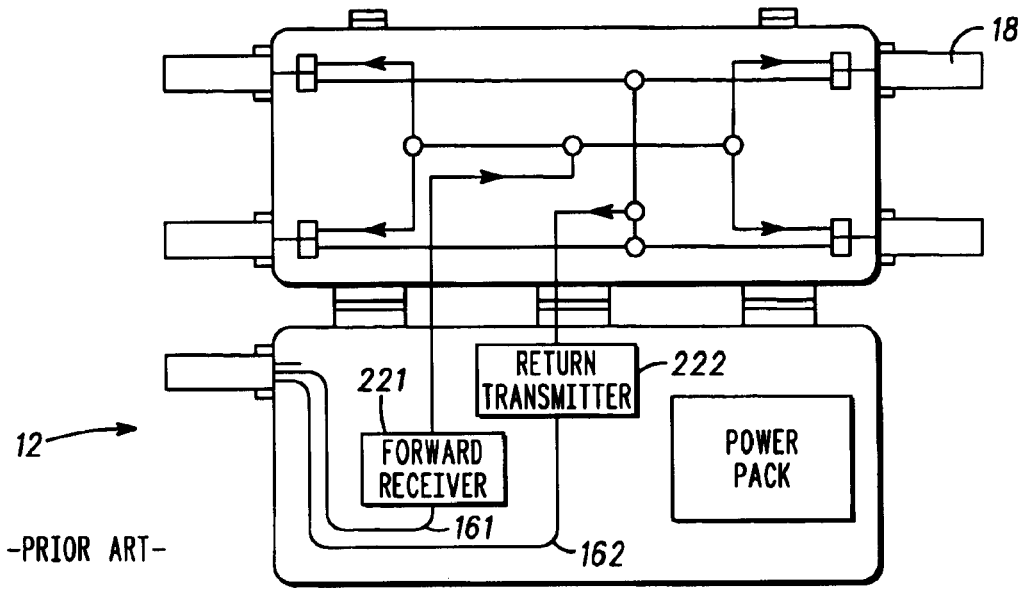
FIG. 2 shows a conventional optical node that may be incorporated in the system shown in FIG. 1.

As shown in FIG. 2, the optical node 12 typically includes an O/E forward path receiver 221 for converting the optically-formatted downstream information, via the fiber link 161, into downstream electrical signals which are transmitted on coaxial cable 18 to the subscribers' home 14. The optical node 12 also includes an E/O return path transmitter 222 for converting electrically-formatted upstream information, received via the coaxial cable 18, into optically-formatted upstream information, which is transmitted along fiber link 162 to the return path receiver 172.

Figure 3:
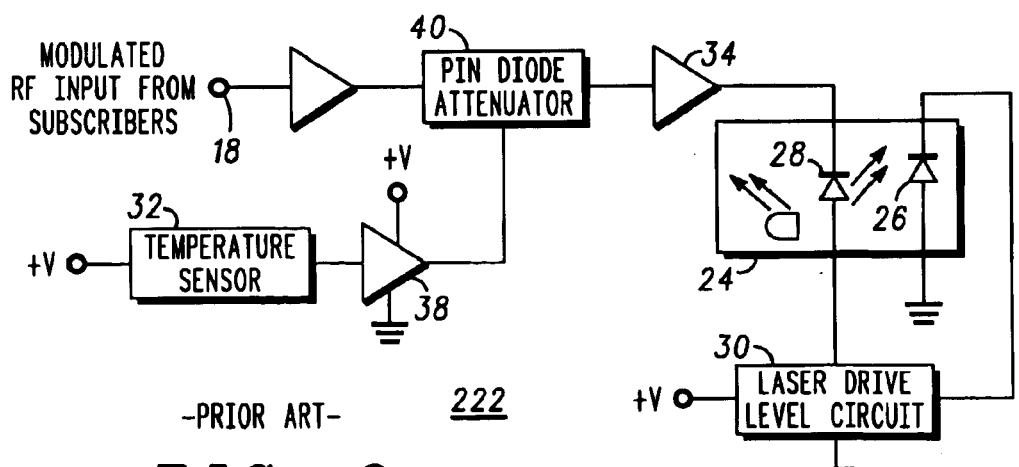
FIG. 3 is a block diagram of a conventional return path laser transmitter employed in a optical node for transmitting upstream information.

FIG. 3 is a block diagram of the E/O return path transmitter 222 employed in a conventional optical node 12 for transmitting upstream information. As shown, the RF signal received from subscribers 14 on coaxial cable 18 ultimately serves to modulate the laser module 24. Laser module 24 is commercially available in either a Distributed Feedback (DFB) or Fabry-Perot (FP) assembly and incorporates a laser cavity 28 and a photodiode 26. The photodiode 26 collects a controlled amount of light directed to the rear facet cleave of the laser cavity 28. The light detected by the photodiode is generally proportional to the actual optical output power of the laser emitted through the front facet of the laser cavity 28. The laser module 24 is electrically biased by the laser bias control unit 30. In conventional systems, the E/O return path laser transmitter 222 also includes thermal compensation circuitry to minimize changes in the received optical power at the headend as the optical node temperature varies. The thermal compensation circuitry is arranged in an open loop configuration that includes a temperature sensor (thermistor) 32, voltage level compensation circuit 38 and a p-i-n (Positive Intrinsic Negative) diode attenuator 40. The thermal compensation circuitry compensates for variations in the output power of the laser that arise from the temperature fluctuations in the optical node 12.

In operation, the temperature sensor 32 detects the ambient temperature and produces a voltage that is directed to a series of voltage amplifiers indicated generally by 38. The amplifiers 38 are enabled incrementally as the temperature increases in a manner determined by a calibration curve. The calibration curve shows the change in gain or optical output power from the laser that arises from the fluctuations in temperature from a predefined, e.g., room temperature. The output from the temperature compensation circuit 38 is a voltage value that is inversely proportional to the deviation in the anticipated optical output power of the laser arising from temperature fluctuations. This voltage is used to control the impedance of the p-i-n diode attenuator 40. The voltage is applied to a control circuit (which includes both level and slope control with a multiplicity of break points) such that the RF drive level is adjusted in approximate compensation for the efficiency of the laser diode as a function of the control parameter (in this case, temperature). The impedance of the p-i-n diode attenuator 40 changes inversely with the temperature compensation voltage. This, correspondingly, controls the RF drive level which determines the Optical Modulation Index (OMI) of the laser 24. Accordingly, the OMI level of the laser is varied by the change in RF drive amplitude level so that it returns to an optimal level at the predefined temperature.

As previously mentioned, techniques to stabilize the operating characteristics of the laser, such as the aforementioned technique to stabilize the output power of the laser with respect to temperature, fail to take into account the particular characteristics of the individual laser. Rather, calibration curves have been incorporated which only account for the typical performance of a large population of lasers e.g., a single manufacturing lot of lasers.

In accordance with the present invention, a method is provided to stabilize or optimize operating characteristics of the output signal from a laser subassembly, i.e., the active components of the laser including the laser cavity, photodiode, and associated electronics. Such operating characteristics include without limitation the optical output power, BER, NPR and distortion of the optical signal. For a given laser subassembly, the present invention generates a multidimensional correction curve that relates the various operating characteristics of the laser output signal to the various control parameters that drive the laser subassembly. Such control parameters include the bias level, temperature, RF drive level, slope efficiency, tracking error control and the threshold voltage of the laser subassembly. Since the correction curve is generated for each particular laser subassembly, it will reflect the actual characteristics of the laser subassembly and not simply the typical or average performance of a large population of laser subassemblies. The correction curve may relate any one or more of the operating characteristics to any one or more of the control parameters.

The correction curve may be employed by the controller that drives the laser subassembly in a variety of different ways. For example, the correction curve may be embodied in a look-up table or other database that can be accessed by the controller. Alternatively, a closed-loop control circuit may be employed that measures the operating characteristics of the laser subassembly and adjusts the control parameters accordingly.

The present invention achieves a number of advantages over the conventional stabilization technique depicted in connection with the return path laser transmitter shown in FIG. 3. For example, the only control parameter and operating characteristic that are employed in FIG. 3 is temperature and optical output power, respectively. Moreover, the stabilization technique does not account for the individual characteristics of the laser, but only typical laser diode (as distinct from subassembly) characteristics averaged over many lasers.

Figure 4:
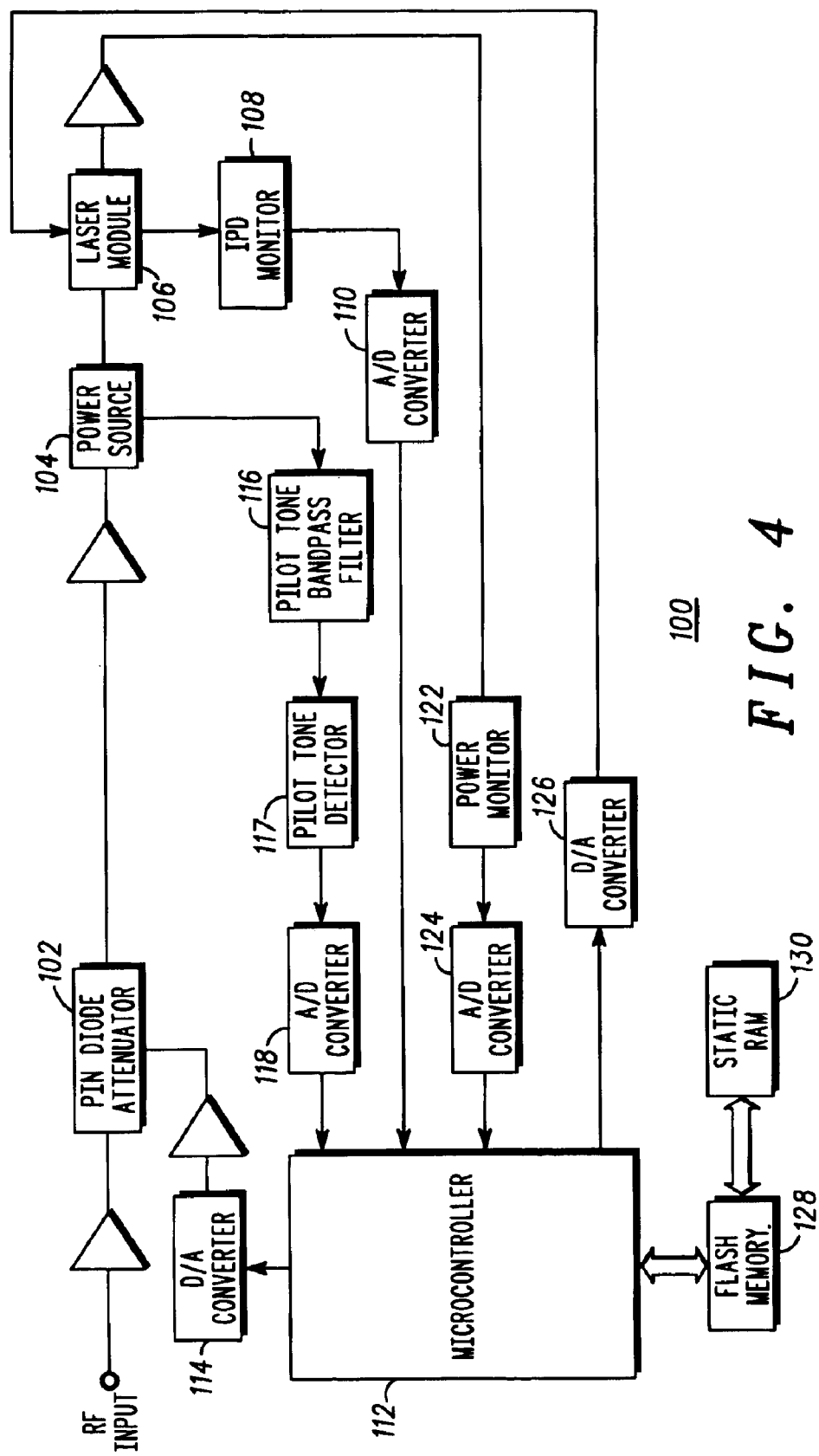
FIG. 4 is a block diagram of the return path laser transmitter for an optical node constructed in accordance with the present invention.

One particular embodiment of the invention that improves upon the arrangement of FIG. 3 is shown in FIG. 4. FIG. 4 is a block diagram of an E/O return path laser transmitter 100 that includes a closed loop laser power stabilization circuit in accordance with the present invention. The return path laser transmitter 100 may be employed in an optical node such as shown in FIG. 4 for transmitting upstream information. In contrast to the return path laser transmitter shown in FIG. 3, the return path laser transmitter employs a closed loop configuration that compensates for temperature changes as well as other environmental changes that impact the laser gain. Similar to the return path laser transmitter shown in FIG. 3, the return path laser transmitter 100 includes a laser module 106 such as a commercially available Distributed Feedback (DFB) or Fabry-Perot (FP) laser assembly that comprises a laser and a photodiode.

In operation, the return path signal received at the node from the subscribers 14 is directed to a compensatory sub-circuit 102 before modulating the laser module 106. The compensatory sub-circuit, which includes various elements such as a p-i-n attenuator, is used to adjust the transfer function of the sub-circuit. The compensatory sub-circuit 102 adjusts the amplitude level of the RF signal at its output in response to information received from one or more feedback paths so that the optical output of the laser remains stable. While FIG. 4 shows three such feedback paths that may be employed, the present invention encompasses arrangements employing any combination of one or more of the feedback loops.

One of the feedback paths shown in FIG. 4 measures the current from the photodiode incorporated in the laser module 106. As previously mentioned, the photodiode output is directly proportional to the actual laser output power. The current generated by the photodiode is received by a detector 108, which converts the current to a voltage that, in turn, is converted by an analog to digital (A/D) converter 110 into an incremental voltage level that is recognized by the microprocessor 112. The microprocessor 112 compares the value of the photodiode output to a predefined value stored in memory. The microprocessor output is a value that is proportional to the deviation in the actual photodiode output from the predefined value. The microprocessor output is converted to a voltage by a digital to analog converter (DAC) 114, which is used to control the resistance of the p-i-n diode attenuator 102. The resistance of the p-i-n diode attenuator 102 changes inversely with RF drive level. The RF drive level determines the Optical Modulation Index (OMI) of the laser 24. The OMI is also known as the Depth of Modulation (DOM). Accordingly, the OMI level of the laser is varied by the change in RF level or amplitude so that it returns to a predefined level.

FIG. 4 also shows a second feedback path that may be employed in the present invention. In a conventional manner a voltage proportional to the laser drive current is established by the IPD monitor 108. The IPD monitor 108 scales this proportional voltage so that it is proportional to the optical output of the laser. For example, the scaling factor is typically chosen so that 1 Volt corresponds to 1 milliwatt. The scaled voltage is thus an indirect measurement of the optical output power of the laser. The scaled voltage can also be used to determine the efficiency of the laser over its operational temperature range.

FIG. 4 also employs a third feedback path that measures the RF drive level received from the RF post amplifier and compares it to a value stored in memory 128 via the microprocessor 112. The RF drive level may be conveniently measured if the RF signal contains a pilot tone which is often the case when frequency stacking is employed. In a frequency stacked system, the RF signals received at the optical node 12 from two or more subscribers share a common return bandwidth that are frequency stacked one above the other and transmitted over a wider bandwidth. For example, four subscribers may each use a 35 MHz upstream bandwidth that is upconverted into a composite signal that encompasses a bandwidth from 51 to 328 MHz. Accordingly, optical node 12 may include an upconverter that precedes the laser module. A pilot tone is often transmitted with the upconverted composite signal, which is used to synchronize the downconversion process in the headend, thus removing any frequency errors. For example, in a conventional system in which the bandwidth extends from 51 to 328 MHz, the pilot tone is typically located in the middle of the band.

As shown in FIG. 4, an RF directional coupler 104 detects the RF signal received from the RF post amplifier 34 and directs it to a bandpass filter 116 which removes all RF components other than the pilot tone. The power level of the pilot tone is measured by detector 117, converted to a digital value by an A/D converter 118 and compared to a value stored in memory via the microprocessor 112. The error correction voltage between the measured power level of the pilot tone and the stored value is used to control the PIN diode attenuator 102 in the manner previously described.

The various algorithms employed by the microprocessor 112 to determine the feedback parameters are stored in memory such as a nonvolatile memory. For example, as shown in FIG. 4, a FLASH memory 128 may be advantageously employed because it is nonvolatile, rewritable and inexpensive. Because a rewritable memory is employed, the algorithms may be upgraded when necessary. Moreover, data may be stored in the memory that relates to laser characteristics such as its calibration curve (defining changes in gain with temperature) which are specific to the laser (and the entire laser module subassembly) that is actually in use rather than typical laser characteristics of an average laser. Accordingly, prior to being installed in a return path laser transmitter, every individual laser package may be tested by subjecting it to incremental changes in temperature. The gain of the laser diode as a function of temperature can be measured and stored in the FLASH memory so that appropriate feedback parameters can be determined which are tailored to the particular laser being tested.

In FIG. 4, the FLASH memory is supplemented with a static RAM 130 to facilitate the process of downloading updated information. The static RAM is advantageously employed because data cannot be simultaneously read from and written to FLASH memory. Accordingly, in order to perform an upgrade without interrupting service, the original data stored in FLASH memory 128 is transferred to static RAM 130 at startup. The microprocessor now operates out of static RAM 130. The updated data can now be sent to the FLASH memory 128. In this way, service need not be interrupted because the microprocessor 112 will retrieve data from the static RAM 130 during the download process.

What is claimed is:

1. An optical transmitter, comprising:
   a laser subassembly generating an optical signal having a plurality of operating characteristics;
   a controller for driving the laser subassembly by applying at least one control parameter thereto, said controller including a predetermined, empirically derived database relating the plurality of operating characteristics of the laser subassembly to the control parameters, said controller adjusting at least one control parameter based at least in part on data extracted from the database so that at least one of the operating characteristics is substantially optimized, wherein the control parameters include a current level generated by a photodiode, a laser drive current and a drive level of an electrically-formatted upstream signal.

2. The optical transmitter of claim 1 further comprising a closed-loop control circuit that includes said database.

3. The optical transmitter of claim 1 wherein said controller includes a look-up table in which said database is located.

4. The optical transmitter of claim 1 wherein said operating characteristics include optical output power.

5. The optical transmitter of claim 4 wherein said operating characteristics further include BER, NPR and distortion.

6. The optical transmitter of claim 1 wherein said at least one control parameter includes a bias level, temperature, RF drive level, slope efficiency, tracking error control and threshold voltage.

7. The optical transmitter of claim 1 wherein said laser subassembly includes a laser diode and a photodetector.

8. The method of claim 1 wherein said operating characteristics include optical output power.

9. The method of claim 8 wherein said operating characteristics further include BER, NPR and distortion.

10. A method to account for performance variations in individual laser subassemblies to be employed in optical transmitters generating an optical signal having a plurality of operating characteristics, said method comprising the steps of:

generating, for each individual laser subassembly while in an operational state, a correction curve relating the plurality of operating characteristics of the laser subassembly to a plurality of control parameters applied thereto;

for each individual laser subassembly, providing a controller for driving the laser subassembly by applying at least one of the control parameters thereto, establishing, for each individual laser subassembly, communication between said controller and the correction curve associated with a given laser assembly so that the control parameters are adjustable based on the correction curve to substantially optimize at least one of the operating characteristics of the given laser subassembly, wherein the control parameters include a current level generated by a photodiode, a laser drive current, and a drive level of an electrically-formatted upstream signal.

11. The method of claim 10 wherein said control parameters include a bias level, temperature, RF drive level, slope efficiency, tracking error control and threshold voltage.

12. An optical node employed between a headend and a plurality of subscribers in a hybrid/fiber coax transmission system, said optical node comprising:

an O/E receiver for converting an optically formatted downstream signal received from the headend to an electrically formatted downstream signal transmitted to at least one of the subscribers;

an E/O transmitter for converting an electrically-formatted upstream signal from the subscriber to an optically-formatted upstream signal transmitted to the headend, said E/O transmitter including:

a laser module; and at least one closed-loop feedback path adjusting a characteristic of the electrically formatted upstream signal in response to a measured parameter so that an optical level generated by the laser module is maintained at a prescribed value, wherein said at least one closed-loop feedback path comprises at least three closed loop feedback paths, said measured parameters including a current level generated by the photodiode, a laser drive current, and a drive level of the electrically-formatted upstream signal directed to the laser module.

13. The optical node of claim 12 wherein said laser module includes a laser cavity and a photodiode, and said measured parameter is a current level generated by the photodiode.

14. The optical node of claim 12 wherein said measured parameter is a laser drive current.

15. The optical node of claim 12 wherein said measured parameter is a drive level of the electrically formatted upstream signal directed to the laser module.

16. The optical node of claim 12 wherein said at least one closed-loop feedback path comprises a plurality of closed loop feedback paths, said measured parameters including a current level generated by the photodiode and a laser drive current.

17. The optical node of claim 15 wherein the electrically-formatted upstream signal includes a pilot tone for synchronizing a frequency stacked signal, and said measured drive level is a drive level of the pilot tone.

18. The optical node of claim 12 wherein said optical feedback path includes a microprocessor for comparing the measured parameter to a predefined stored value and generating a difference signal.

19. The optical node of claim 18 further comprising means for adjusting a drive level of the electrically-formatted upstream signal directed to the laser module in response to said difference signal.

20. The optical node of claim 19 wherein said adjusting means includes a p-i-n diode attenuator.

21. The optical node of claim 21 wherein said feedback loop further comprises an analog to digital converter for converting the measured parameter to a voltage recognized by the microprocessor.

22. The optical node of claim 21 wherein said feedback loop further comprises a digital to analog converter for converting the difference signal to a voltage recognized by said adjusting means.

23. The optical node of claim 19 further comprising a memory for storing an algorithm employed by the microprocessor for comparing said measured parameter to the predefined stored value.

24. The optical node of claim 23 wherein said memory is a FLASH memory.

25. The optical node of claim 23 wherein said algorithm includes a calibration curve relating a characteristic of the laser module to an environmental parameter.

26. The optical node of claim 16 wherein said laser module characteristic is gain and said environmental parameter is temperature.

27. The optical node of claim 12 wherein the optical level generated by the laser module is an optical power level.

28. The optical node of claim 12 wherein the optical level generated by the laser module is defined by an optical modulation index.

29. An optical transmitter for converting an electrically-formatted upstream signal from a subscriber to an optically-formatted upstream signal transmitted to a headend, said transmitter comprising:

a laser module; and at least one closed-loop feedback path adjusting a characteristic of the electrically formatted upstream signal in response to a measured parameter so that an optical level generated by the laser module is maintained at a prescribed value, wherein the electrically-formatted upstream signal includes a pilot tone for synchronizing a frequency stacked signal, and said measured parameter is a drive level of pilot tone.

* * * * *